Oct. 9, 1934.   L. O. DAVIS   1,975,772
YIELDABLE CLUTCH PLATE
Filed May 4, 1931
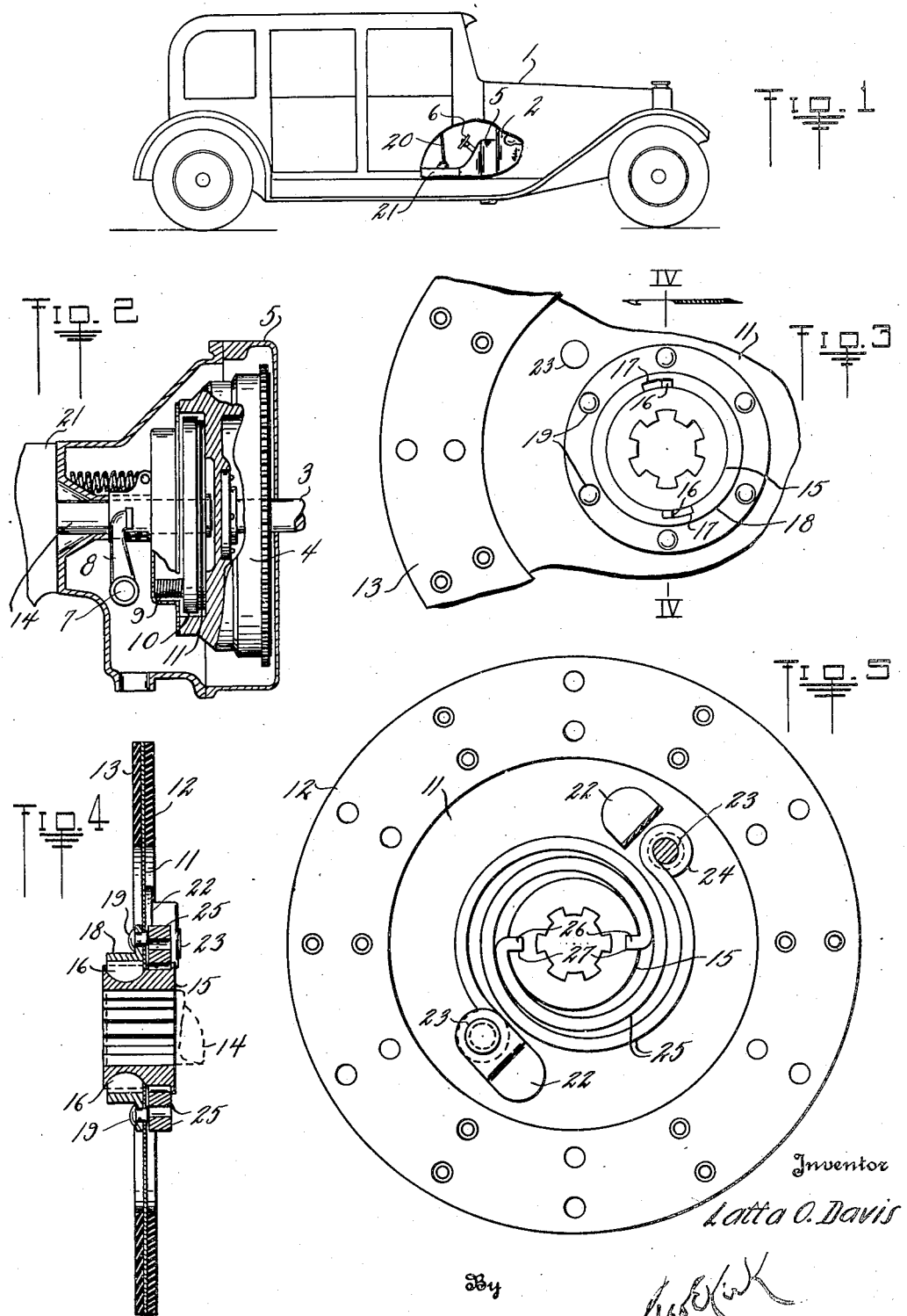
Inventor
Latta O. Davis
By
Attorney Patented Oct. 9, 1934

1,975,772

UNITED STATES PATENT OFFICE 1,975,772

YIELDABLE CLUTCH PLATE

Latta O. Davis, Toledo, Ohio

Application May 4, 1931, Serial No. 534,888

2 Claims. (Cl. 192—68)

This invention relates to yieldable take-up mechanisms.

This invention has utility when incorporated in transmissions, especially for smoothing out torque changes, as in the propeller shaft from reciprocating engine propelled motor vehicles, as well as dampening motor vibrations.

Referring to the drawing:

Fig. 1 is a view in side elevation of an automobile, with parts broken away, having an embodiment of the invention incorporated therein;

Fig. 2 is a detail view with parts in section, showing an embodiment of the invention as in the clutch of the automobile of Fig. 1;

Fig. 3 is a fragmentary view of the clutch disk from the motor side thereof;

Fig. 4 is a section thru the disk on the line IV—IV, Fig. 3, and

Fig. 5 is a side elevation of the disk on the transmission, or propeller shaft side, that is, away from the engine, showing features of the yieldable take-up mechanism as adapted thereto.

Motor vehicle 1 is shown as having multicylinder reciprocating engine 2 provided with crank shaft 3 on which is mounted fly wheel 4 located in housing 5. Clutch operating foot lever 6 is mounted on fixed fulcrum 7 and has upstanding arm 8 effective against the resistance of springs 9 to locate clutch element 10 clear of clutch engagement with intermediate clutch element 11 which has the frictional faces 12, 13. The springs 9 are normally effective to hold the elements 10, 11, into engaged relation with the drive from the fly wheel 4.

Driven shaft 14 is aligned with the driving shaft 3 and is provided with a fluted terminus as a key assembly in collar 15. This collar 15, at the engine side of the disk or transmission element 11 has keys 16 coacting for limited angular movement in key ways 17 in sleeve 18, anchored, say by rivets 19 with the disk 11.

At the opposite side of the disk 11, the collar 15 has a yieldable take-up connection to the disk coacting to hold the keys 16 in the ways 17 at the forward or take-up position shown in Fig. 3 in clockwise crank shaft rotation for one standing in front of the car 1. This means that when load is applied to the shaft 14, say by operating gear shift lever 20 in the car to connect up for a driving speed in the transmission housing 21, the torque is applied by the take-up as a constant load on the motor shaft 3 and the keys 16 may move to the other limit in the ways 17.

Brackets 22 may be welded to the disk 11, preferably in diametrical relation when but two springs are used. These brackets 22 provide anchorage for pins 23 thru the disk 11. The pins 23 extend thru eyes 24 as termini for a pair of spiral springs 25, partially nesting in their inter-wrapping in a common plane adjacent the disk 11. The springs 25 have inner termini 26 entering seats 27 of the collar 15, shown at about 90° from the keys 16 and at the other end of the collar 15 therefrom. The springs 25 are under sufficient initial torsion to require load pick up before the keys 16 move along the ways 17 to connect for the positive driving transmission. In this tightening up of the two springs 25 upon each other, they are wound inward about the collar 15 to hold the termini 26 in engagement. The eyes 24 compensate for this spring movement which has been in an instance in practice ⅝" at a 2¼" radius when the keys 16 had a travel of ¼" in the ways 17. On a 5" radius disk this means there may be lineal movement of 1⅜" in this yieldable take-up.

It is thus seen that there comes into play a positive drive, taking the extreme load off the springs 25. However, in slowing down, or variation of torque, the springs come into play in smoothing out the handling of the load. This is of worth, not only in reducing driving irregularity in transmission to the car and its travel with lengthened life to accrue therefrom, but has economy in mileage per gallon of fuel consumed for a given speed, or for a greater maintained speed for a given quantity of fuel. There is thus smoothness in acceleration and deceleration as well as low cost of manufacture.

What is claimed and it is desired to secure by Letters Patent is:

1. A clutch disk having annular friction faces upon opposite sides thereof, said disk having a web inwardly from said friction faces, pins projecting from one side of said web, a sleeve in the disk, said sleeve having seats, a spring from each pin extending about the sleeve and having offset termini to engage the sleeve seats in assembling the disk with the sleeve for relative shifting therebetween a flange from the disk concentric with the sleeve and thereabout, said flange having a recess toward the sleeve, and key means fixed with the sleeve and shiftable in the recess as the springs take up load between the disk and sleeve.

2. A centrally open clutch disk having annular friction faces upon opposite sides thereof, said disk having a web inwardly from said friction faces, a pair of pins projecting from one side of the web, a sleeve through the opening of the disk, a flange on the side of the disk opposite from said pins, key means between the sleeve and flange limiting movement of the disk relatively to the sleeve, said sleeve on the opposite side of the disk having diametrical seats, and a pair of full-wrap-providing nested springs between the pins and seats providing connection for relative movement between the disk and sleeve.

LATTA O. DAVIS.